UNITED STATES PATENT OFFICE.

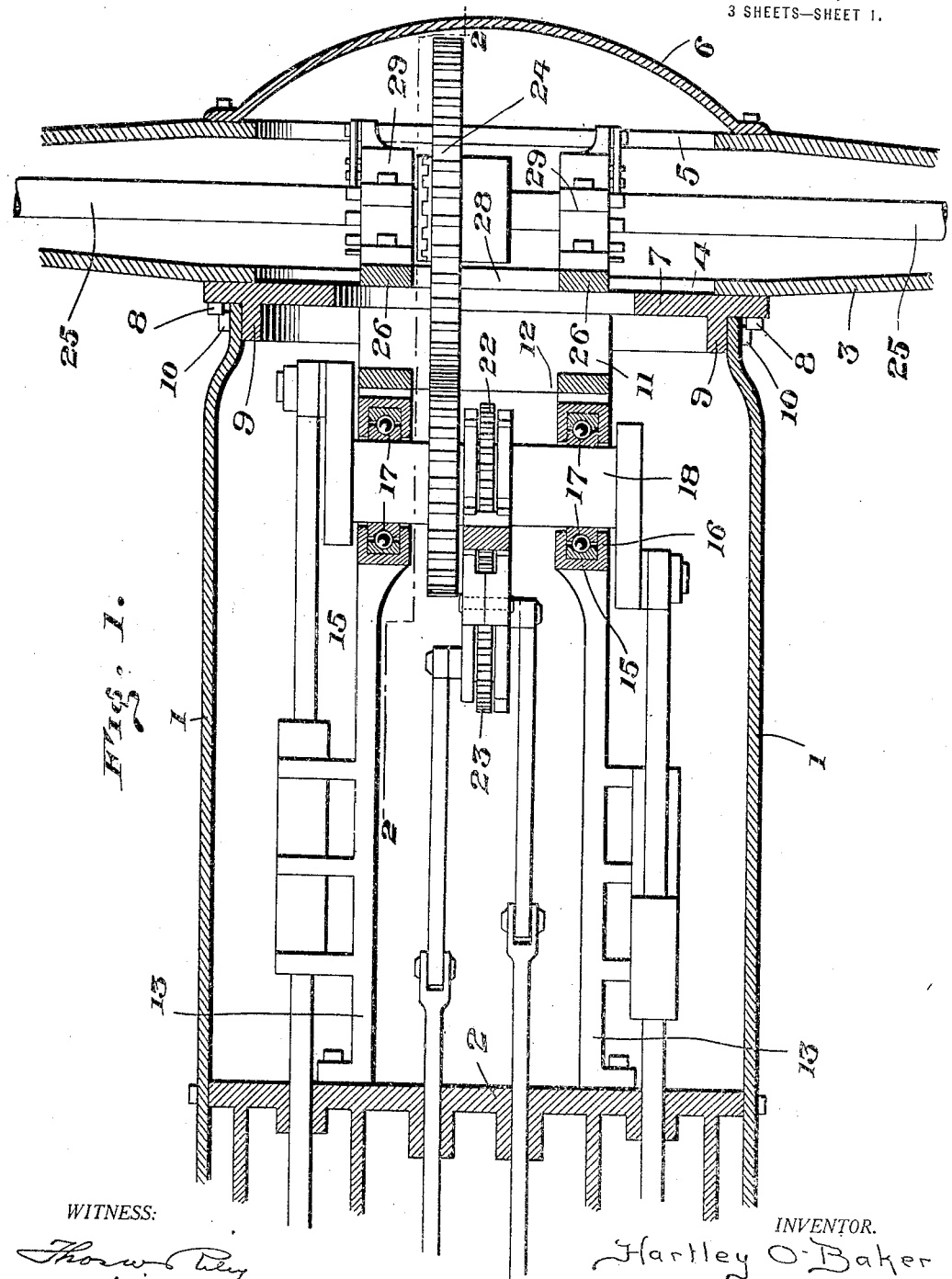

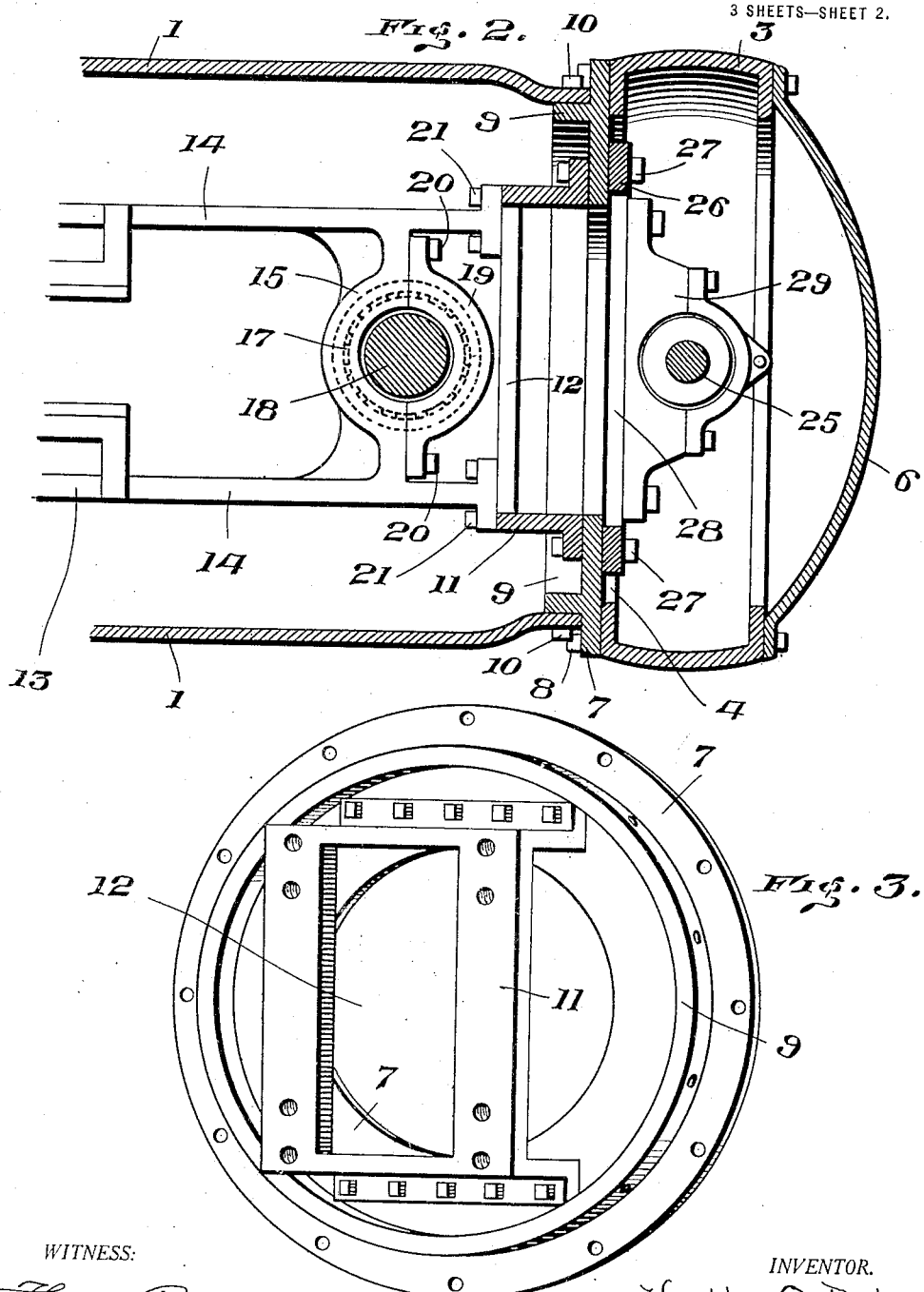

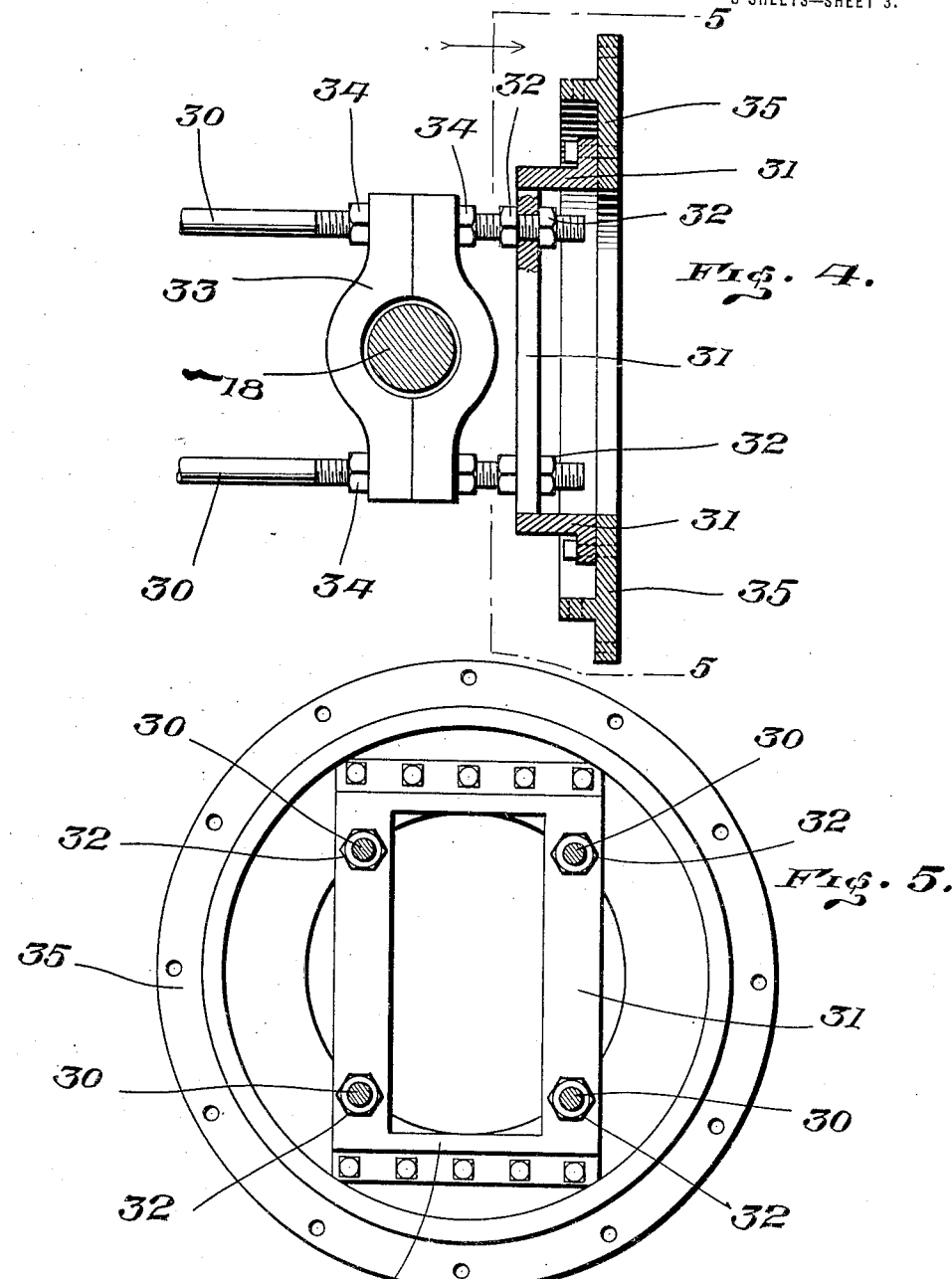

HARTLEY O. BAKER, OF PUEBLO, COLORADO, ASSIGNOR TO THE BAKER STEAM MOTOR CAR AND MANUFACTURING CO., INC., OF PUEBLO, COLORADO.

AXLE CONNECTION FOR ENGINES.

1,336,716.   Specification of Letters Patent.   Patented Apr. 13, 1920.

Application filed October 19, 1918. Serial No. 258,798.

*To all whom it may concern:*

Be it known that I, HARTLEY O. BAKER, a citizen of the United States, residing at Pueblo, in the county of Pueblo and State of Colorado, have invented certain new and useful Improvements in Axle Connections for Engines; and I do hereby declare the following to be a full, clear, and exact description of the invention, such as will enable others skilled in the art to which it appertains to make and use the same.

This invention relates to engine construction and more particularly to means for supporting and connecting fluid expansion engines and the mechanism by which power is transmitted therefrom to a driving axle.

The prime object of the invention is to provide simple and inexpensive construction of this character which can be quickly and readily disassembled or adjusted to vary the mesh of the main driving gear with the differential gear.

A further object of the invention is to provide an annular plate for connecting the rear end of the engine casing to a standard rear axle housing, said plate carrying a suitable bracket for the support of one end of the engine frame.

A further object of the invention is to provide a connecting plate with a removable engine frame supporting bracket which can be replaced by another bracket of a different size to vary the mesh of the main driving gear with the differential gear.

A still further object of the invention is to provide a connecting plate with a bracket plate designed to support suitable bearings for the inner ends of semi-floating axle sections or any other type of axle.

With these and other objects in view as will appear as the description proceeds, the invention comprises the various novel features of construction, combination and arrangement of parts which will be more fully described hereinafter and afterward specifically claimed.

Referring to the drawings:

Figure 1 represents a fragmentary sectional plan view of a fluid expansion engine and its connection to a standard rear axle housing;

Fig. 2 represents a sectional view, taken on a plane indicated by the line 2—2 of Fig. 1;

Fig. 3 represents a detail perspective view of the connecting plate and the offset bracket;

Fig. 4 represents a detailed sectional elevation of a modified form of engine frame and its connection to the connecting plate; and Fig. 5 represents a sectional view, taken on a plane indicated by the line 5—5 of Fig. 4.

Referring more particularly to the drawings, it will be seen that 1 designates the engine casing in which is mounted the rear cylinder head plate 2. 3 is a rear axle housing, preferably of standard construction and is provided at its front and back with the usual openings 4 and 5, the latter being closed by a cover plate 6.

The engine casing is connected to the axle housing through the medium of an annular connecting plate 7 by bolts 8, said plate being provided adjacent its peripheral edge with a lateral circular flange 9 designed to be positioned within the rear end of the engine casing to support the latter, suitable bolts 10 being employed to rigidly connect these parts. An offset bracket 11 is detachably connected to or formed integral with one side of the connecting plate and is provided with an opening 12, through which the main driving gear may project to mesh with the differential gear.

13 indicates the main engine frame members, each of which consists of a pair of spaced bars 14 connected adjacent their rear ends by a part 15 recessed as at 16 to receive a ball bearing 17 for the support of the engine crank shaft 18. 19 is a bearing strap which is also recessed like the part 15 to receive the ball bearing 17 and this part 19 is detachably connected to the part 15 by bolts 20 whereby the bearing straps can be detached to remove the engine crank shaft. The front ends of the engine frame members are detachably connected to the cylinder head plate 2 while the rear ends are detachably connected by bolts 21 to the upper and lower parts of the offset bracket 11.

22 indicates the valve driving gear fixed on the engine crank shaft and has meshing and coöperating therewith the valve adjusting gear indicated generally by the numeral 23. The shaft 18 also carries the main driving gear which projects through the opening 12 in the offset bracket 11 into mesh with the main differential gear 24 supported by the inner ends of the axle sections 25.

The bracket plate 26 is detachably connected to a rear face of the connecting plate 7 by bolts 27 and is provided with an opening 28 through which the differential gear 24 projects. Suitable axle bearings indicated broadly by the numeral 29 are detachably connected to this bracket plate and serve to support the inner ends of the axle sections 25.

From this construction it will be apparent that the various parts of the engine may be quickly and readily disassembled or the engine may be quickly disconnected from the rear axle housing. Should it be desired to vary the mesh of the main driving gear with the differential gear, the particular size of said bracket 11 as shown may be replaced by another size of bracket to suit the particular purpose in view. Furthermore, it will be apparent that if desirable the engine frame together with the engine crank shaft and mechanism supported thereby can be quickly and readily removed from the engine casing by simply disconnecting the ends of the engine frame members from the rear cylinder head plate and the offset bracket.

In some instances it may be desirable to use a flexible engine frame in lieu of the rigid frame members 13 and to accomplish this result, I employ flexible rods 30 as indicated in the modified form of construction shown in Figs. 4 and 5. The rear ends of each of these rods is threaded for a portion of its length and project through apertures in the offset bracket 31, nuts 32 being positioned on the rods so as to bear on opposite sides of the offset bracket, said nuts providing means whereby the engine frame rods may be tightened and adjust the depth of mesh of the main driving gear with the differential or coöperating gear at will to eliminate the well known humming or grinding of the gears. Each pair of frame rods supports an engine crank shaft bearing 33 embodying complementary parts, both of which are detachable as a single unit and may be adjusted and held backward and forward upon the rods by nuts 34.

In this construction, like in the previously described one, the offset bracket 31 is detachably connected to an annular connecting plate 35 identical in construction with the previously described one.

While I have described the preferred forms of my invention, I desire it understood that such changes in the construction, proportion and arrangement of various parts may be made when desired as are within the scope of the appended claims.

What I claim is:

1. In an automobile driving mechanism, a rear axle housing, a cylinder head plate, a crank shaft frame having one end rigidly secured to said head plate, an annular plate secured to said axle housing, means connecting the other end of said frame and annular plate, and a casing surrounding said frame and having one end secured to said head plate, said annular plate having supporting means surrounding the aforesaid connecting means on which the other end of the casing is fitted and secured.

2. In an automobile driving mechanism, a rear axle housing, a cylinder head plate, an annular plate secured to the axle housing, a bracket carried by said annular plate and offset toward said head plate, a crank shaft frame having one end secured to the head plate and the other end secured to said bracket, and a casing surrounding said frame having one end secured to said head plate, said annular plate having supporting means surrounding said bracket on which the other end of the casing is fitted and secured.

3. In an automobile driving mechanism, a rear axle housing, axle sections therein, a differential gear between said axle sections, a cylinder head plate, an annular plate secured to said axle housing, brackets carried by said annular plate and projecting into the axle housing and supporting said axle sections, a frame having one end secured to said head plate, means connecting the other end of said frame and annular plate, a crank shaft carried by said frame connected to said differential gear, and a casing surrounding said frame having one end secured to said head plate, said annular plate having supporting means surrounding the aforesaid means on which the other end of said casing is fitted and secured.

4. In an automobile driving mechanism, a rear axle housing, axle sections therein, a differential gear between said axle sections, a cylinder head plate, an annular plate secured to the axle housing, brackets carried by the annular plate and projecting into the axle housing and supporting said axle sections, a bracket carried by the annular plate opposite to the aforesaid brackets and offset toward the head plate, a frame having one end secured to the head plate and the other end secured to the last named bracket, a crank shaft moved in said frame and connected to said differential gear, and a casing surrounding said frame having one end secured to said head plate, said annular plate having supporting means surrounding the last named bracket on which the other end of the casing is fitted and secured.

In testimony whereof I have signed my name to this specification in the presence of two subscribing witnesses.

HARTLEY O. BAKER.

Witnesses:
P. S. BROWN,
FRONIE ABELL.